United States Patent
Son et al.

(10) Patent No.: US 7,865,500 B2
(45) Date of Patent: Jan. 4, 2011

(54) APPARATUS AND METHOD FOR SHARING SERVICES ON NETWORK

(75) Inventors: Kyoung-ho Son, Seoul (KR); Dong-shin Jung, Seoul (KR); Jae-shin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 576 days.

(21) Appl. No.: 10/995,178

(22) Filed: Nov. 24, 2004

(65) Prior Publication Data

US 2005/0138037 A1    Jun. 23, 2005

(30) Foreign Application Priority Data

Dec. 8, 2003    (KR)    .................... 10-2003-0088754

(51) Int. Cl.
G06F 7/00    (2006.01)
(52) U.S. Cl. ..................................... 707/712
(58) Field of Classification Search ................ 707/101, 707/712
See application file for complete search history.

(56) References Cited

U.S. PATENT DOCUMENTS 6,430,599 B1 *    8/2002    Baker et al. .................. 709/203

2002/0083322 A1 *    6/2002    Lagosanto et al. .......... 713/172

FOREIGN PATENT DOCUMENTS

| | | |
|---|---|---|
| EP | 1324217 A1 | 7/2003 |
| JP | 9-244985 A | 9/1997 |
| JP | 10-243156 A | 9/1998 |
| JP | 2001-243075 A | 9/2001 |
| JP | 2002-078036 A | 3/2002 |
| JP | 2002-247668 A | 8/2002 |
| JP | 2003-91553 A | 3/2003 |
| JP | 2003-330732 A | 11/2003 |

OTHER PUBLICATIONS

Sun Microsystems: "Jini™ Discovery and Join Specification", Jan. 25, 1999, XP002154096.
Feng-Chao Yang, "Design and implement of the home netwotking service agent federation using open service gateway", Integration of Knowledge Intensive Multi-Agent Systems, 2003. International Conference on Sep. 30-Oct. 4, 2003, Piscataway, NJ, USA, IEEE, Sep. 30, 2003, pp. 628-633, XP010669183.

* cited by examiner

*Primary Examiner*—Apu M Mofiz
*Assistant Examiner*—Ajith Jacob
(74) *Attorney, Agent, or Firm*—Sughrue Mion, PLLC

(57) ABSTRACT

A method and apparatus for sharing services on a network are provided. The method can include a first embedded device transmitting a message requesting a service, to an embedded device connected with the first embedded device over the network, the first embedded device receiving code information for implementing the service from the embedded device receiving the message, the first embedded device executing the code information and implementing the service, and the first embedded device registering service information on the service when implementation of the service is completed.

12 Claims, 6 Drawing Sheets

APPARATUS AND METHOD FOR SHARING SERVICES ON NETWORK

This application claims the priority of Korean Patent Application No. 10-2003-0088754 filed on Dec. 8, 2003, in the Korean Intellectual Property Office, the disclosure of which is incorporated herein in its entirety by reference

BACKGROUND OF THE INVENTION

1. Field of the Invention

The present invention relates to an apparatus and a method for sharing services on a network and, more particularly, to a method for sharing and managing services between each network device.

2. Description of the Related Art

With the rapid advancements in digital technology and the rapid popularization of the Internet, the infrastructures for digital homes are under development to provide a variety of services helpful and convenient to everyday life of customers by practically using such advancements. The digital home technology is aimed at providing high-quality services by utilizing well-equipped external communication infrastructures beyond the simplicity of home networks.

The digital home may be said to be a new paradigm of cultivating new service markets by integrating various ITs (Information Technologies) such as home network technology, information electronic appliance technology, software platforms, solutions and contents.

The terminology referring to the future home with the home networking infrastructure may be exemplified by the following: connected home, smart home, digital home, and so forth. While the use of multiple parts is a common concept in each of the infrastructures, the inter-connected home emphasizes connection of inter-home digital appliances. Particularly, the smart home gives a great deal of weight to home automation services capable of controlling/managing inter-home digital appliances locally or remotely. In contrast, the digital home gives weight to sharing digital multimedia such as music, pictures, video, and so on, and providing digital content services in cooperation with the Internet.

In order to build the digital home, several technologies of home networks, access networks, contents and solutions are required.

The home network technology includes wired/wireless network technology such as power line communication (PLC), telephone line communication, wired LAN (Local Area Network), IEEE1394, wireless LAN, wireless 1394 and so forth; middleware technology such as HAVi (Home Audio Video Interoperability), Jini (Java Intelligent Network Infrastructure), UPnP (Universal Plug and Play), and so forth which support a plug-and-play function; home or household gateway technology for providing an external access network with a network termination function as well as a modem function and providing an inter-network cooperation function; and service platform technology for transmitting and managing multiple services to information electronic appliances connected to home networks via an access network at a remote location.

Here, an example of digital home service platforms is an OSGi (Open Services Gateway Initiative) service platform.

The term OSGi is the abbreviation for Open Services Gateway Initiative. The OSGi was a non-profit standardization organization formed by 15 industry leaders including Ericsson, Sun Microsystems and IBM on March 1999, which was aimed at creating an open standard, by which various services on the network are delivered to local networks or equipment and the delivered services are operated.

The OSGi defines both a framework for service delivery/management and an OSGi bundle. The OSGi bundle is a unit which can be produced and installed, and is packaged with interface, configuration information, executable code and digital signature.

OSGi Release 1.0 consists of a framework which is based on the OSGi standard, a log service, an HTTP service and a device manager. The framework allows application services to share one Java virtual machine, manages life cycles of bundles, Java packages, resources, dependency between the bundles and so on, and has service registries for cooperation between the bundles. The log service provides services that can write and read events generated in the framework. The HTTP service is allowed to provide access to service platforms through a web. And the device manager provides a dynamic device driver downloading model.

In OSGi Release 2 published in October 2001, services such as package management, permission management and user management are provided in addition to the functions of Release 1.

In OSGi Release 3 published in March 2003, services such as start level management, Jini and UPnP are provided in addition to the functions of Release 2. Furthermore, many services are added to the OSGi Release 3 so as to support a gateway for a vehicle as well as a gateway for SOHO (Small Office Home Office).

The OSGi service platform generally focuses on three fields: first, connection and control between the services, second, connection and control between the service and the OSGi framework, and third, connection and control between the OSGi framework and the external service management system. Thus, the OSGi service platform is interposed between an external network such as the high-speed network and a network for connecting in-home appliances.

In the external network environment, a service provider performs service provision and management. In the in-home network environment, numerous appliances and different protocols must smoothly connect and control one and another. The OSGi service platform is ultimately an arbitrator for the external and in-home network environments.

The OSGi standard is created to operate on the basis of a Java virtual machine. The Java virtual machine functions to buffer differences between an embedded OS (Operating System) and an embedded CPU (Central Processing Unit).

All of the OSGi services are included in a physical package called a bundle.

A plurality of OSGi services may be contained in one bundle, which is made up of a basic unit for deployment and management of bundles.

It is the framework that manages these bundles. The framework has a service registry, which performs service registration, inquiry, execution, deletion and so forth. In addition, the framework handles events, detection and counter-processing of the events. Here, the event is a logical event based on a generator of three kinds of events: Service, Bundle, and Framework. The event is logical regardless of a physical event generated from the equipment.

In other words, the OSGi standard may be said to be a middleware for incorporating, controlling and managing various devices and services in the home network environment. The OSGi standard developed up until now can be described based on where a single OSGi server is located either at the home gateway or a single device under the environment of the physically connected home network. Thus, all the services are governed in block, and the devices and services registered in the OSGi framework are readily available therein.

FIG. 1 illustrates a method for running bundles in a conventional OSGi framework.

OSGi frameworks 100 and 150 register and manage bundles 120, 130, 170 and 180 by means of bundle contexts 110 and 160. Each of the bundle contexts 110 and 160 can be as many as the number of the bundles, and thus a one-to-one mapping architecture is constituted. Each bundle context takes charge of functions of installing the bundle and calling services, handles events generated from respective frameworks 100 and 150, and controls details involved in execution of the bundle.

As shown in FIG. 1, the bundle is not shared between the OSGi frameworks. Therefore, the bundle that is separately desired must be installed and registered within the framework itself. The separately desired bundle is invoked and activated through the bundle contexts 110 and 160 within a self-executable environment. Even if performing the same function, the identical bundle is not allowed to provide an appropriate service until it is registered with its own framework. For example, when the bundle C 180 is required to execute the bundle B 130 in the framework A 100, the prior art fails to utilize the resource of the framework B 150. Consequently, in the prior art, the bundle C 180 is repeatedly installed in the framework A 100.

Because the above-mentioned prior art is designed for the single OSGi framework, it is impossible to share the common services between each framework, and therefore, each device must be repeatedly installed and registered within its own OSGi framework. Further, in the case of a business model involving leasing, selling etc. of the services, there exists an inconvenience such that the user or lessee must pay duplicate expenses for each device in order to obtain the same service. Moreover, when another service, which is required to provide a service requested by a current device, is registered and managed within an OSGi framework which is being executed by another device, there is no method where the current device is capable of either requesting the service to another device or registering the service with its own OSGi framework. For this reason, a new method for solving the problems is needed.

SUMMARY OF THE INVENTION

To solve the above-mentioned problems, the objective of the present invention is to provide a method for sharing and recycling resources and service bundles needed between a plurality of OSGi frameworks when each of the frameworks is operated at a separate device.

In order to accomplish the objective, there is provided a method for sharing services on a network, comprising a first step of, at a first embedded device, transmitting a message requesting at least one service to at least one embedded device connected with the first embedded device over the network, a second step of, at the first embedded device, receiving code information for implementing the service from the embedded device receiving the message, a third step of, at the first embedded device, executing the code information and implementing the service, and a fourth step of, at the first embedded device, registering service information on the service when implementation of the service is completed in the third step. Here, preferably, the code information is code information described in Java language, and the service information is network identification information of the embedded device transmitting the code information.

Further, the second step includes a sub-step of, when the first embedded device repeatedly receives the code information for implementing the service, neglecting the repeatedly received code information.

Further, the fourth step includes a sub-step of storing the received code information for a predetermined time.

Further, the fourth step includes a sub-step of deleting the received code information.

In order to accomplish the objective, there is provided a method for sharing services on a network, comprising a first step of, at a first embedded device, searching service information on at least one service from a predetermined information storage region, a second step of transmitting a message requesting the service to a second embedded device identified by the service information searched in the first step, a third step of, at the first embedded device, receiving code information for implementing the service from the second embedded device, and a fourth step of, at the first embedded device, executing the code information to implement the service. Here, the code information is code information described in Java language, and the service information is network identification information of the embedded device transmitting the code information.

The fourth step includes a sub-step of, after implementing the service, storing the received code information for a predetermined time.

The fourth step also includes a sub-step of, after implementing the service, deleting the received code information.

In order to accomplish the objective, there is provided a method for sharing services on a network, comprising a first step of, at a first embedded device, receiving a message requesting at least one service from at least one embedded device connected with the first embedded device over the network, a second step of, at the first embedded device, receiving the message requesting the service, checking whether the first embedded device retains the service or not, and a third step of, when the service is retained in the second step, transmitting code information for implementing the service to the embedded device requesting the service. Here, the code information for implementing the service is code information described in Java language.

In order to accomplish the objective, there is provided an apparatus for sharing services on a network, comprising: a service transceiver unit transmitting a message for requesting a predetermined service to an embedded device connected over the network, and receiving code information for implementing the service; a service parsing unit searching whether or not service information on the service is contained; and a service loader unit loading the code information received from the service transceiver unit or unloading the loaded code information. Here, the code information for implementing the service is code information described in Java language, and the service information is network identification information of the embedded device having the code information for implementing the service.

In order to accomplish the objective, there is provided an apparatus for sharing services on a network, the apparatus comprising a receiving unit for receiving a message requesting a predetermined service from an embedded device connected over the network; and a checking unit for checking whether or not code information is retained for implementing the service, wherein when the service is retained, transmitting the code information to the embedded device. Here, preferably, the code information for implementing the service is code information described in Java language.

BRIEF DESCRIPTION OF THE DRAWINGS

The above objectives, features and advantages of the present invention will become more apparent from the following detailed description when taken in conjunction with the accompanying drawings, in which.

DETAILED DESCRIPTION OF THE EXEMPLARY EMBODIMENT

Hereinafter, an apparatus and a method for sharing services on a network consistent with an embodiment of the present invention will be described with reference to the attached drawings.

In order to facilitate the understanding of the present invention, the present invention will be described using a system based on an OSGi framework as an example, but it may be applied to middleware having a function similar to the OSGi framework.

Figure 1:
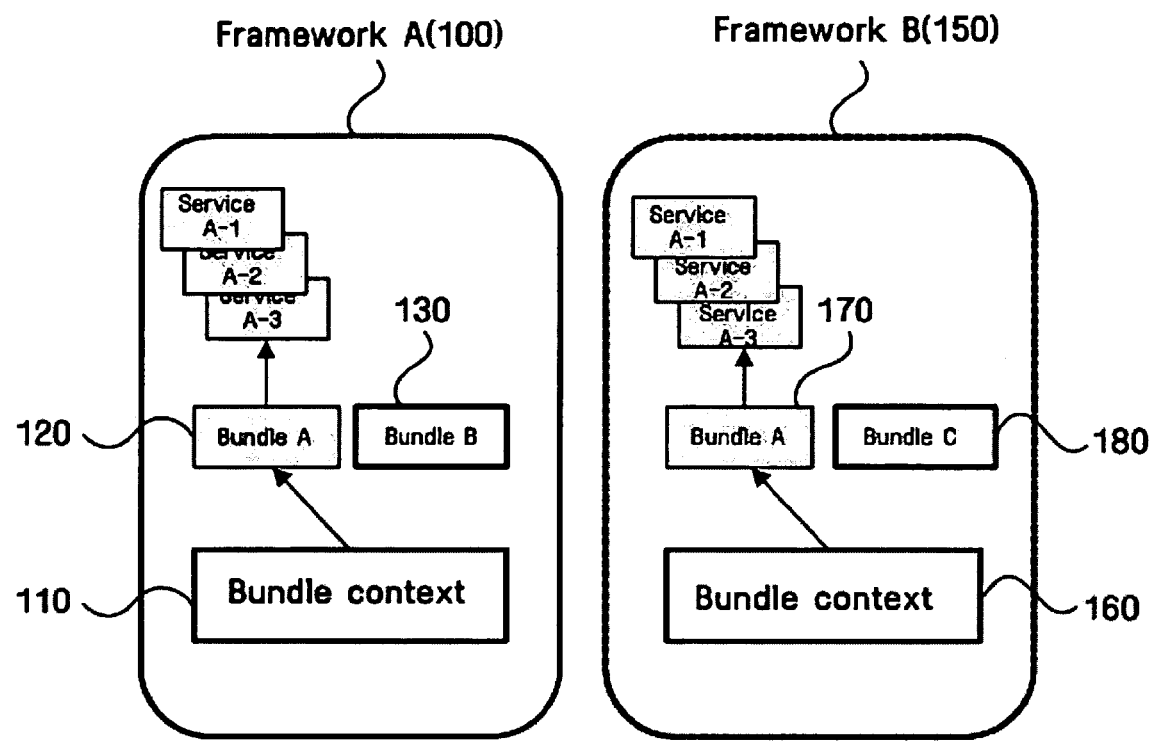
FIG. 1 illustrates a method for running bundles in a conventional OSGi framework.
Figure 2:
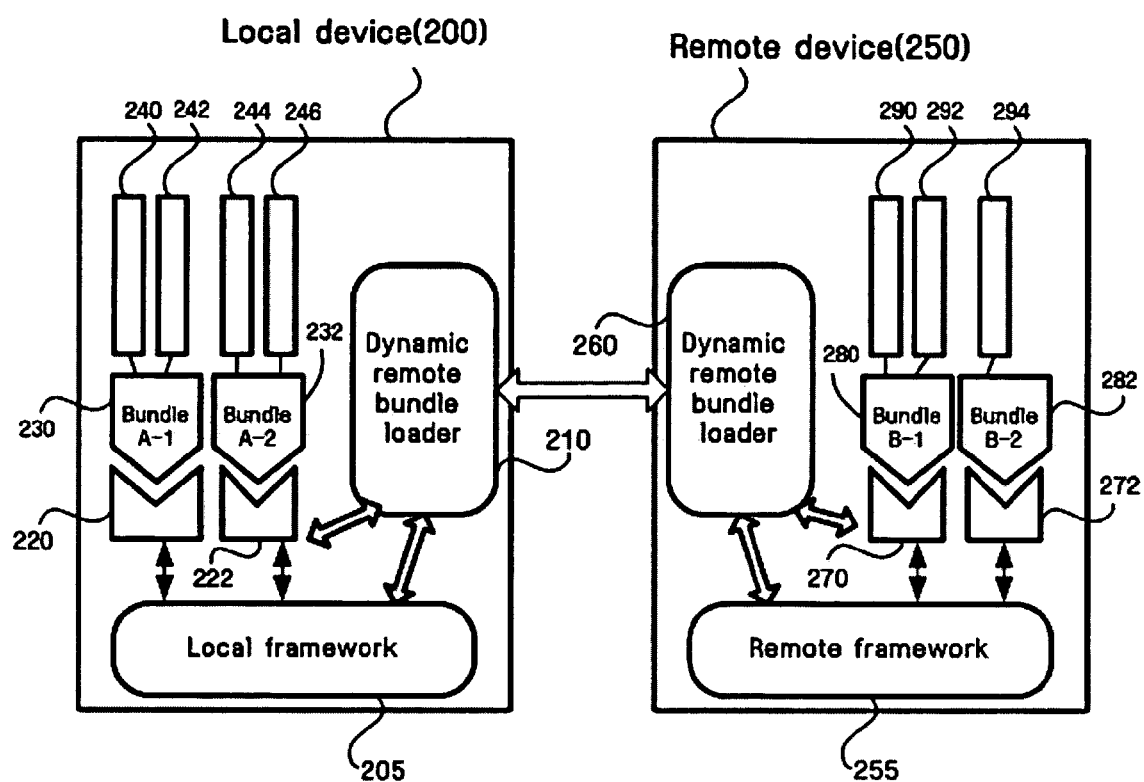
FIG. 2 illustrates an overall module structure consistent with an embodiment of the present invention.

FIG. 2 illustrates an overall module structure consistent with an embodiment of the present invention.

A local device 200 includes a framework 205, bundle contexts 220 and 222, bundles 230 and 232, services 240, 242, 244 and 246 belonging to the bundles respectively, and a dynamic remote bundle loader 210. Similarly, a remote device 250 includes a framework 255, bundle contexts 270 and 272, bundles 280 and 282, services 290, 292, and 294 belonging to the bundles respectively, and a dynamic remote bundle loader 260. Here, each module represents the following function.

Each of the frameworks 205 and 255 stands for an OSGi framework. Herein, the framework of the device requesting the bundle will be referred to as a "local framework," while the framework of the device receiving the request of the bundle will be referred to as a "remote framework."

Each of the local bundle contexts 220 and 222 is a module which manages installation and registration of the bundles, call of the services, and so forth in the local framework 205 with which the bundles and services under current execution are registered. Each local bundle context verifies whether the bundle requested by the service under execution is registered or not. When the requested bundle has already been in the current local framework 205, each local bundle context transmits a reference location of that bundle which exists within the local device 200. However, when the requested bundle is not registered with the local framework 205 at present, the local bundle context notifies the dynamic remote bundle loader 210 that the local bundle context itself requires the requested bundle, and waits for the response.

The remote bundle contexts 270 and 272 check a list of bundles registered with the remote device 250, according to a request of the bundle received by the dynamic remote bundle loader 260 on the remote framework side. Then, when it is ascertained that the bundle corresponding with the requested bundle is present, each remote bundle context transmits a reference location of that bundle to the dynamic remote bundle loader 210 of the local device 200.

Each of the bundles 230, 232, 280 and 282 is a package of one or more related services, which may be said to be a set of services. Here, the services are shared between each device in a unit of bundle.

Each of the dynamic remote bundle loaders 210 and 260 is a module which performs request of the bundles and its response functions by exchanging messages with the bundle contexts 220, 222, 270 and 272. On the local device 200 side of requesting the bundles, a specification on the bundles which each of the bundle contexts 220 and 222 requests is transmitted to the remote device 250. On the remote device 250 side, the bundles which are provided by the bundle contexts 270 and 272 are transmitted to the local device 200.

Figure 3:
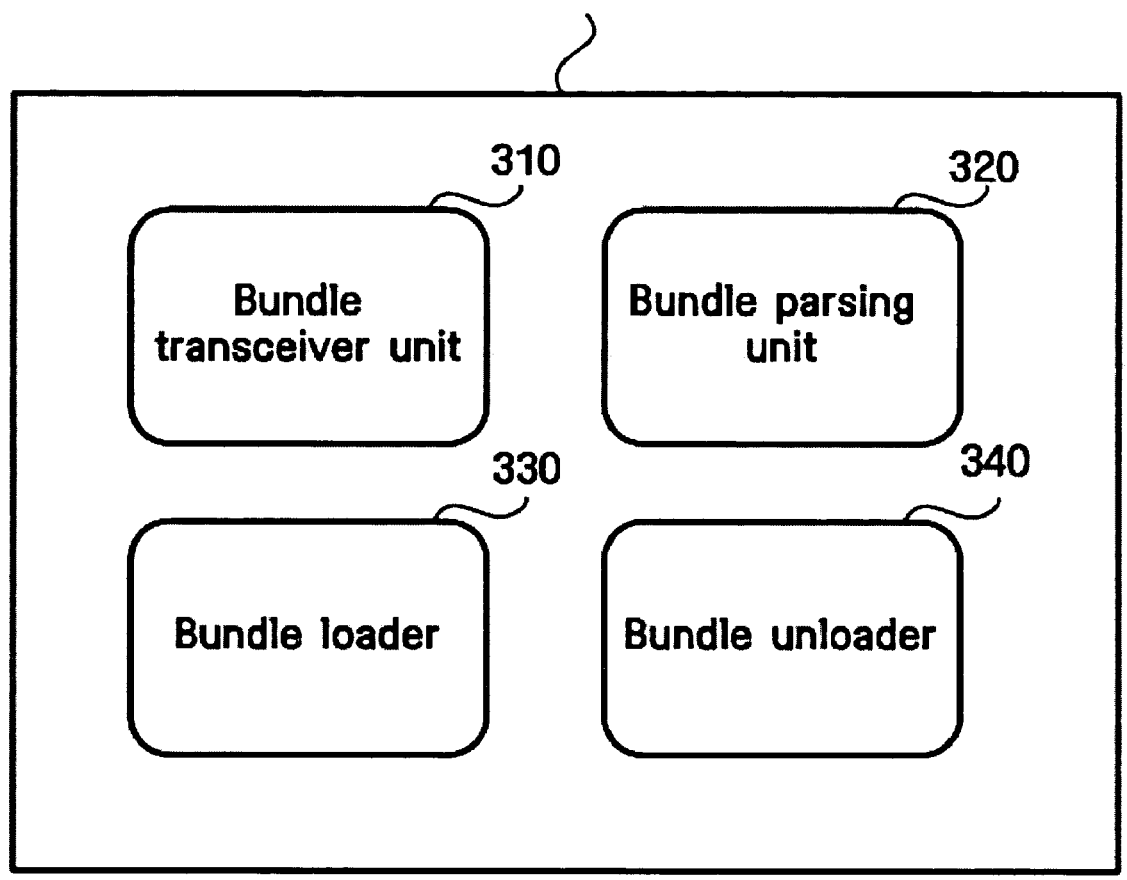
FIG. 3 illustrates a configuration of a dynamic remote bundle loader consistent with an embodiment of the present invention.

FIG. 3 illustrates a configuration of a dynamic remote bundle loader consistent with an embodiment of the present invention.

A dynamic remote bundle loader 300 comprises a bundle transceiver unit 310, a bundle parsing unit 320, a bundle loader 330 and a bundle unloader 340. Alternatively, both the bundle loader 330 and the bundle unloader 340 may be a single module. Hereinafter, the following description will be made regarding functions of the components of the dynamic remote bundle loader 300.

The bundle transceiver unit 310 is a unit taking charge of transmission of messages, request of bundles, or transmission/reception of the requested bundles. The message requesting the bundle is multicasted throughout the entire range connected over the home network. In the framework of another device receiving the requested message, it is checked whether the requested bundle is contained or not, and as a response to the request, the contained bundle itself is transmitted through an HTTP service to the bundle transceiver unit of the device which has requested the bundle. The device on the request side receives the transmitted bundle and performs installation and registration of the received bundle in its own framework. The bundle transceiver unit 310 may comprise a bundle multicast transmission module (not shown) and a bundle multicast reception module (not shown), wherein the bundle multicast transmission module takes charge of transmission of a request message of the device which requests the bundle and transmission of the bundle of the device which receives the request of the bundle, while the bundle multicast reception module functions to receive the request message from the request side as well as the bundle from the response side.

The bundle parsing unit 320 checks the specification of the requested bundle, and requests the bundle context to search the bundle which matches with the specification of the requested bundle and which can be properly implemented under the framework environment of the device requesting the bundle. Because there is a possibility that the requested bundle may not be implemented at the device requesting the bundle according to an operating system where the framework is operated as well as a system resource, a process of checking the specification of the requested bundle is needed. Further, the bundle parsing unit 320 transmits a reference location of the searched bundle to the bundle transceiver unit 310 to allow the bundle to be transmitted.

The bundle loader 330 is a module for installing and registering the received bundle within the framework. Once the bundle is registered with the framework, the registered bundle is implemented with reference to the service requesting the bundle.

If the implemented bundle still remains in the framework, there is a possibility that it could cause a problem due to its occupation of an unexpected system resource. Therefore, the bundle completing its task is removed from the framework again and completely deleted from a memory, and therefore the framework must be restored to the initial state of when the bundle is requested. This function is performed by the bundle unloader 340. Here, as soon as the task is completed, the bundle can be removed from the framework, but it is possible to maintain the bundle in the framework under the desired condition or a predetermined time according to the system resource.

Figure 4:
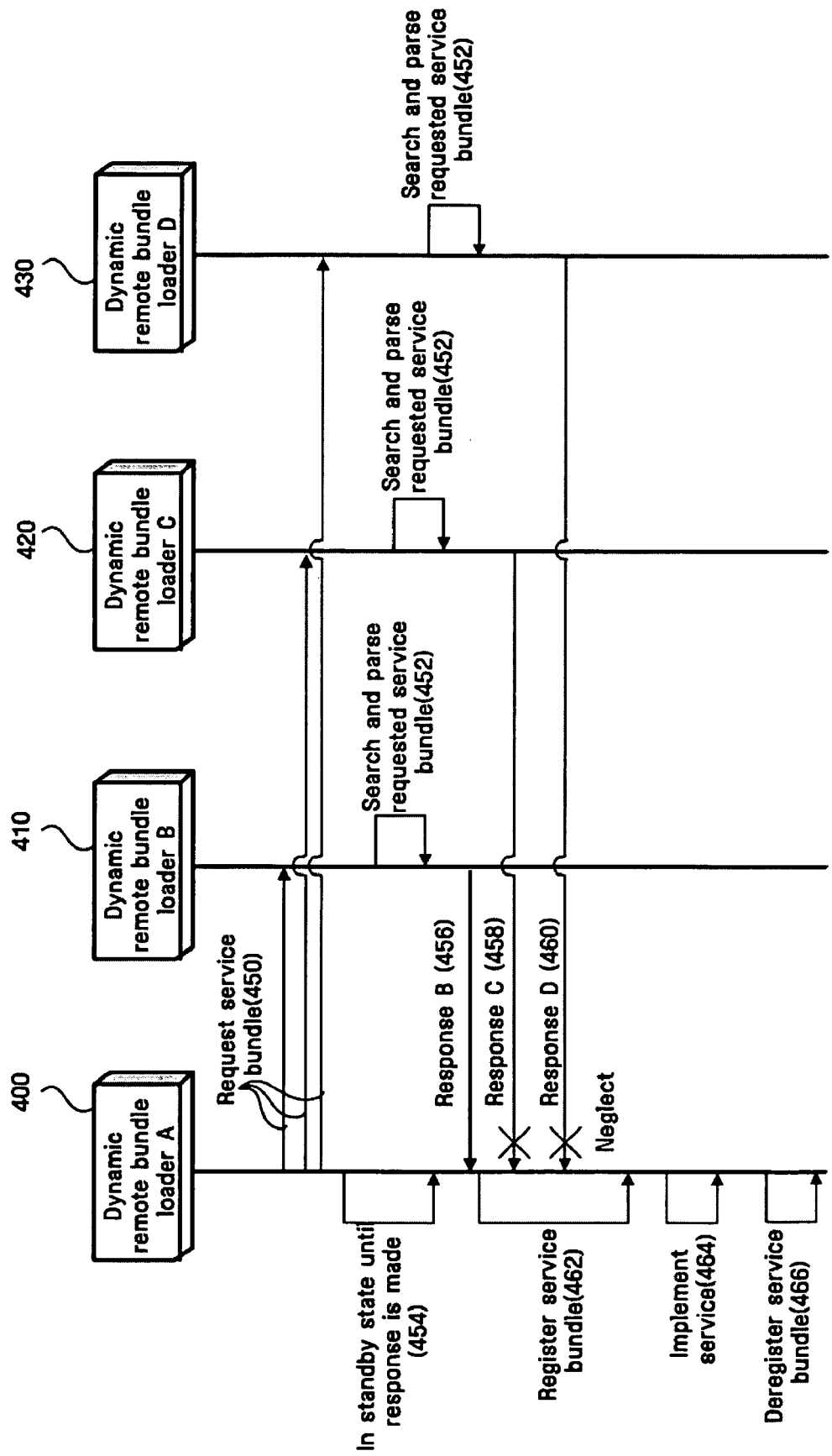
FIG. 4 illustrates an operation between different dynamic remote bundle loaders consistent with an embodiment of the present invention.

FIG. 4 illustrates an operation between different dynamic remote bundle loaders consistent with an embodiment of the present invention.

A dynamic remote bundle loader A (400) requests its own required bundle in a multicast manner with respect to other dynamic remote bundle loaders B, C and D (410, 420 and 430) of each device which are connected over a network (450). Each of the dynamic remote bundle loaders B, C and D (410, 420 and 430) respectively checks whether it contains the requested bundle or not, and then when the requested bundle is present, parses whether the request bundle is suitable to be implemented at the dynamic remote bundle loader A (400) which has requested the bundle (452). For this reason, when the request message is transmitted, information on the system where the dynamic remote bundle loader A (400) is operated is contained in the request message.

In this case, the dynamic remote bundle loader A (400) is in a standby state until a response is made from the other dynamic remote bundle loaders B, C and D (410, 420 and 430) (454).

Among the other dynamic remote bundle loaders B, C and D (410, 420 and 430), any dynamic remote bundle loader containing the bundle matched with the requested bundle transmits the matched bundle to the dynamic remote bundle loader A (400) in response. In this case, the dynamic remote bundle loader A (400) receives the first response (456) transmitted, but neglects the following ones (458 and 460).

When receiving the requested bundle, the dynamic remote bundle loader A (400) registers the received bundle (462). Subsequently, the dynamic remote bundle loader A (400) implements the service using the registered bundle (464), and deregisters the registered bundle when implementation of the service is completed (466).

Figure 5:
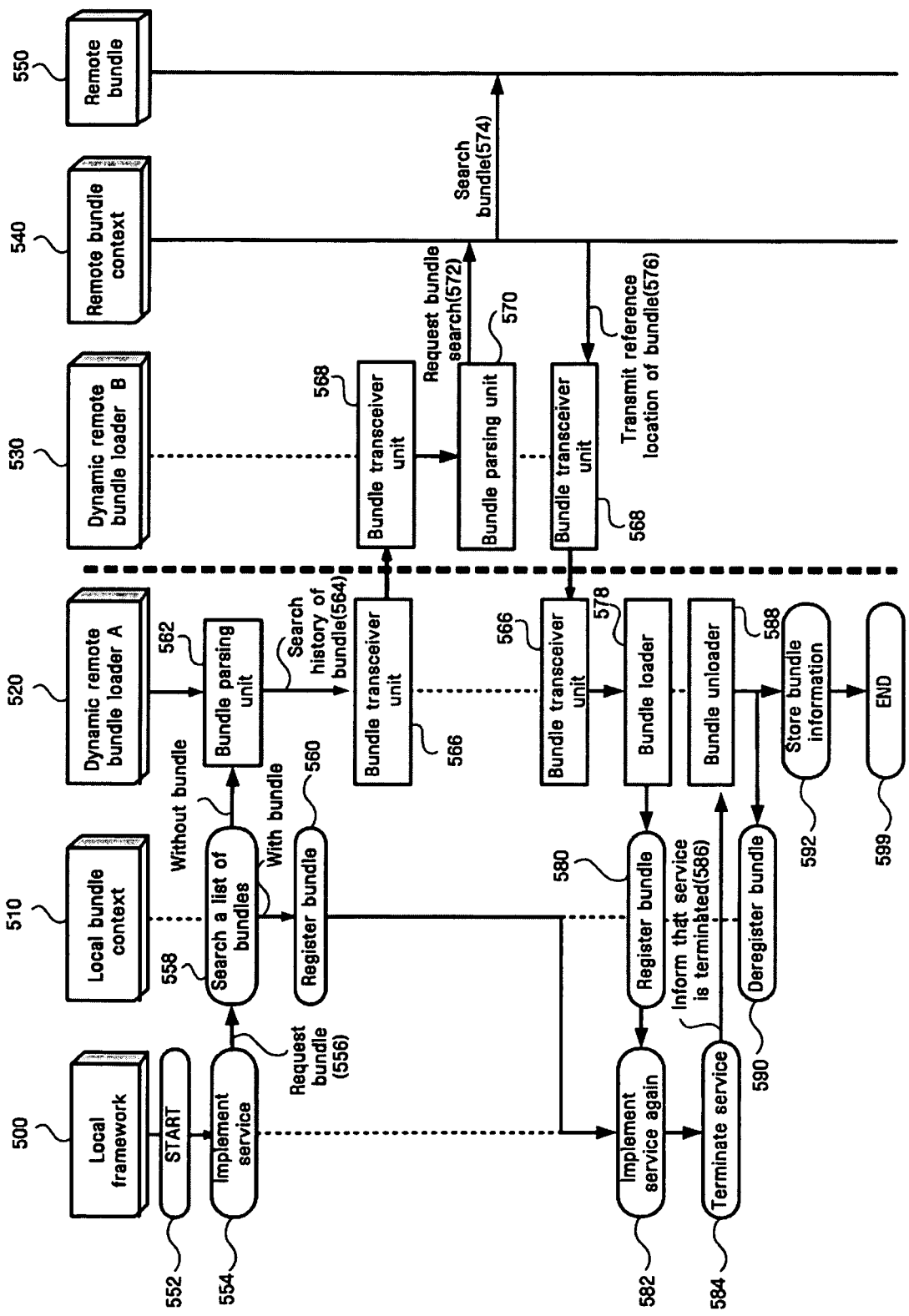
FIG. 5 illustrates an overall system operation consistent with an embodiment of the present invention.

FIG. 5 illustrates an overall system operation consistent with an embodiment of the present invention.

In FIG. 5, a local device side and a remote device side are divided from each other by a thick dotted line, which is longitudinally indicated between a dynamic remote bundle loader A (520) and a dynamic remote bundle loader B (530). Here, the remote device side refers not to a single device or system, but all devices which are connected with the local devices over the network and includes dynamic linking bundle loaders. For the sake of convenience, description of FIG. 5 will be made taking the single device as an example.

Upon beginning its operation (552), a local framework 500 implements a predetermined service (554). Here, the service refers to all kinds of services which perform functions not only with the aid of another service in a composite manner, but also without the aid of another service in an independent manner. When it is necessary to implement a second service, the local framework 500 requests a local bundle context 510 to transmit a bundle for the second service (556). Then, the local bundle context 510 searches a list of bundles (558). When the requested bundle is present, the requested bundle is registered with the local framework 500. Therefore, the second service is implemented again (582).

However, when the requested bundle has not yet been registered in the step 558, the local framework 500 stops implementing the second service, parses a characteristic of the second service, and generates an event requesting a bundle required for the parsed service. The event is transmitted to the dynamic remote bundle loader A (520).

A bundle parsing unit 562 of the dynamic remote bundle loader 520 searches a history of the bundle of interest (564). Specifically, in the case that the same bundle has already been previously received from another device, information of the received bundle is separately stored. Thus, the same bundle is used when requested again.

When there is no information on the bundle which the bundle parsing unit 562 intends to request after a search of its history, a bundle transceiver unit 566 transmits a bundle request message in a multicast manner.

However, when the information of the bundle is present, the bundle transceiver unit 566 transmits a bundle request message in a unicast manner. For this purpose, the information of the bundle may contain location information on the network such as a uniform resource locator (URL) of the device retaining the bundle as well as brief specification of the bundle. When there is no response to the unicast due to change or abnormality in configuration of the network, the bundle request message is transmitted again in the multicast manner.

In a bundle transceiver unit 568 of the dynamic remote bundle loader B (530) which is located at another framework connected with the local framework 500 over the network, the transmitted bundle request message is received, and transmitted to a bundle parsing unit 570.

After checking the specification of the requested bundle, the bundle parsing unit 570 causes a remote bundle context 540 to search the requested bundle (572). The remote bundle context 540 searches a list of registered bundles (574). When finding one of the registered bundles matched with the requested bundle, the remote bundle context 540 transmits a reference location of the found bundle to the bundle transceiver unit 568 (576).

After receiving the reference location of the found bundle, the bundle transceiver unit 568 transmits the found bundle itself to the device which has requested the found bundle using the received reference location of the found bundle. Here, the transmitted bundle, preferably, is a code described in Java language, and may make use of the HTTP service. The bundle transceiver unit 566 of the dynamic remote bundle loader A (520) requesting the bundle receives a first response to the bundle request message, and neglects other responses until the bundle transmitted from the response side is normally registered with its own framework.

When transmission of the requested bundle is completed, as a result of the response, a bundle loader 578 of the dynamic remote bundle loader A (520) requesting the bundle causes the local bundle context 510 to register the received bundle with the local framework 500 (580). However, when there is no response to the request, a process for a predetermined number of retries is performed. When there is no response after the retries, it is impossible to implement the service of interest in the local framework 500. This information is transmitted to the operating system of the device where the local framework 500 is operated. The number of the retries can be set by a separate process.

When installation and registration of the requested bundle is completed in the local framework 500, the service which has initially requested the bundle and whose implementation has been stopped is invoked again and is implemented. The bundle registered with the local framework 500 performs an operation compatible with requirements of the service requesting the bundle (582). When a series of services are terminated (584), the local framework 500 informs a bundle unloader 588 of the dynamic remote bundle loader A (520) that the services have been terminated (586). The bundle unloader 588 causes the local bundle context 510 to remove the bundle registered with the local framework 500. Here, the requested bundle is removed from the local framework 500 and deleted on the memory. The purpose is to constantly maintain the system resource of the local framework 500 and maintain consistency of the system management.

The bundle unloader 588 records information on the service requesting the bundle, together with specification and response location information of the requested bundle (592). Then, when a request for the same bundle is present, the dynamic remote bundle loader A (520) determines whether the request message is directly transmitted in the unicast manner or is subject to a search process in the multicast manner, using information on the recorded bundle.

Figure 6:
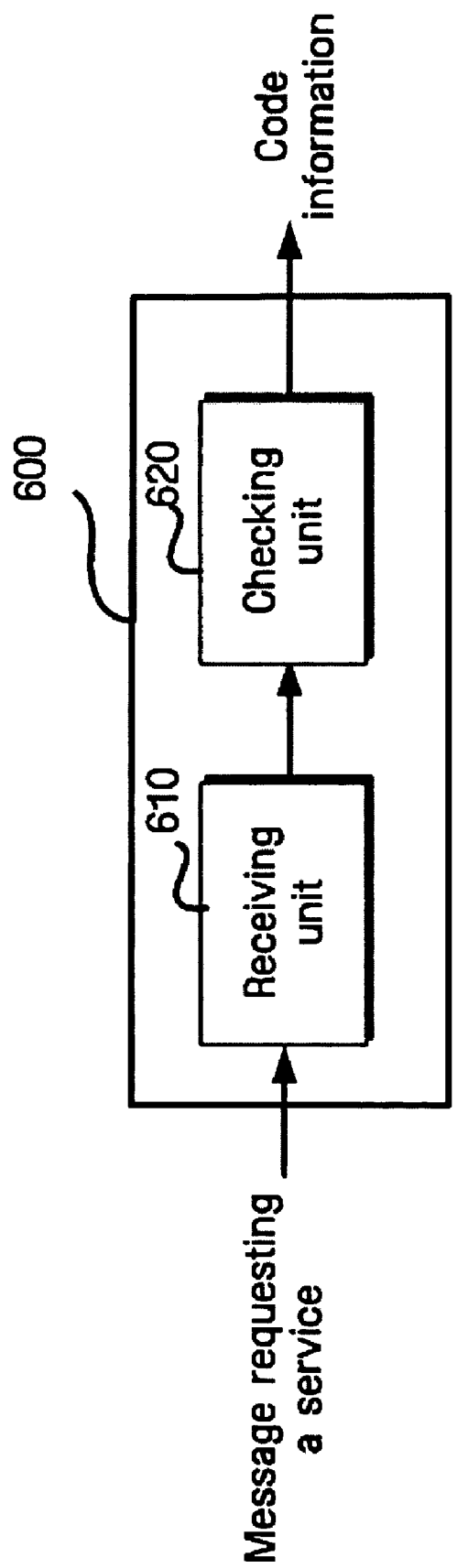
FIG. 6 illustrates a block diagram of an apparatus for sharing services on a network, according to an exemplary embodiment of the present invention.

FIG. 6 illustrates a block diagram of an apparatus 600 for sharing services on a network, according to an exemplary embodiment of the present invention. The apparatus 600 includes a receiving unit 610 and a checking unit 620 for receiving a message requesting a predetermined service from an embedded device connected over the network and for checking whether or not code information is retained for implementing the service, respectively. When the service is retained, the code information is transmitted to the embedded device. The code information for implementing the service can be described in Java language According to the present invention, services which are not registered with a current framework can be automatically implemented without intervention of a user, so that services can be continuously provided. The service is registered and used only during its implementation, and is automatically removed after its implementation, so that a system environment is not changed. Further, it is possible to share the same service bundles needed between the devices where the OSGi framework operates. While maintaining the architecture of the existing OSGi framework, the devices operate utilizing a bundle provided by the framework. Thus, in order to realize the function, a separate correction is not required.

While the present invention has been described in detail in connection with certain embodiments thereof, it will be understood by those skilled in the art that various substitutions, modifications, and variations may fall within the scope of the present invention. Therefore, it should be understood that the foregoing embodiments are to be considered in all respects only as illustrative, and not restrictive.

What is claimed is:

1. A method for sharing services on a network, comprising:
   A) a first embedded device transmitting a message requesting at least one service, to at least one embedded device connected with the first embedded device over the network;
   B) the first embedded device receiving code information for implementing the service from the at least one embedded device receiving the message;
   C) the first embedded device executing the code information and implementing the service; and
   D) the first embedded device registering service information on the service when implementation of the service is completed in the step C,
   wherein the requested message includes information on a system of the first embedded device, and wherein the step B comprises, when the first embedded device repeatedly receives the code information for implementing the service, neglecting the repeatedly received code information.

2. The method as claimed in claim 1, wherein the code information is code information described in Java language.

3. The method as claimed in claim 1, wherein the service information is network identification information of the at least one embedded device transmitting the code information.

4. The method as claimed in claim 1, wherein the step D comprises storing the received code information for a predetermined time.

5. The method as claimed in claim 1, wherein the step D comprises deleting the received code information.

6. A method for sharing services on a network, comprising:
   A) a first embedded device searching service information on at least one service from a predetermined information storage region;
   B) transmitting a message requesting the service to a second embedded device identified by the service information searched in the step A;
   C) the first embedded device receiving code information for implementing the service from the second embedded device; and
   D) the first embedded device executing the code information to implement the service,
   wherein the step D comprises, after implementing the service, the first embedded device storing the received code information for a predetermined time, and
   wherein the requested message includes information on a system of the first embedded device, and wherein the step C comprises, when the first embedded device repeatedly receives the code information for implementing the service, neglecting the repeatedly received code information.

7. The method as claimed in claim 6, wherein the code information is code information described in Java language.

8. The method as claimed in claim 6, wherein the service information is network identification information of the second embedded device transmitting the code information.

9. The method as claimed in claim 6, wherein the step D comprises, after implementing the service, the first embedded device deleting the received code information.

10. An apparatus for sharing services on a network, said apparatus comprising:
   a service transceiver unit which transmits a message for requesting a predetermined service to an embedded device connected over the network, and receives code information for implementing the service;
   a service parsing unit which searches whether or not the message contains service information on the service by searching the service information from a predetermined information storage region; and
   a service loader unit which loads the code information received from the service transceiver unit before one of implementing the service and unloading the loaded code information after implementing the service,
   wherein the service transceiver unit transmits the message in a unicast manner if the predetermined information storage region contains information corresponding to the service, and transmits the message in a multicast manner if the predetermined information storage region does not contain information corresponding to the service, and wherein the message transmitted in the multicast manner comprises information on a system of the apparatus, and wherein when the service transceiver unit repeatedly receives the code information for implementing the service, the repeatedly received code information is neglected.

11. The apparatus as claimed in claim 10, wherein the code information is code information described in JAVA language.

12. The apparatus as claimed in claim 10, wherein the service information is network identification information of the embedded device having the code information for implementing the service.

* * * * *